United States Patent
Zhang et al.

(10) Patent No.: US 10,001,139 B2
(45) Date of Patent: Jun. 19, 2018

(54) ELECTRIC COOLANT PUMP

(71) Applicant: Johnson Electric S.A., Murten (CH)

(72) Inventors: Hong Liang Zhang, Hong Kong (CN); Guan Yin Liang, Shenzhen (CN); An Bang Chen, Shenzhen (CN); Yan Ping Ren, Shenzhen (CN); Rui Feng Qin, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 297 days.

(21) Appl. No.: 14/827,852

(22) Filed: Aug. 17, 2015

(65) Prior Publication Data
US 2016/0047395 A1      Feb. 18, 2016

(30) Foreign Application Priority Data

Aug. 15, 2014  (CN) .......................... 2014 1 0404472

(51) Int. Cl.
| F04D 29/58 | (2006.01) |
| --- | --- |
| H02K 5/20 | (2006.01) |
| H02K 9/06 | (2006.01) |
| H02K 1/32 | (2006.01) |
| F04D 13/06 | (2006.01) |

(52) U.S. Cl.
CPC ..... F04D 29/5813 (2013.01); F04D 13/0626 (2013.01); F04D 29/5806 (2013.01); H02K 1/32 (2013.01); H02K 5/20 (2013.01); H02K 9/06 (2013.01)

(58) Field of Classification Search
CPC ........ H02K 1/32; H02K 5/20; F04D 29/5806; F04D 29/5813
See application file for complete search history.

(56) References Cited

U.S. PATENT DOCUMENTS 6,087,744 A * 7/2000 Glauning ................. H02K 1/32
310/58
2013/0259720 A1   10/2013 Mills et al.

* cited by examiner

*Primary Examiner* — Patrick Hamo
(74) *Attorney, Agent, or Firm* — Muncy, Geissler, Olds & Lowe, P.C.

(57) ABSTRACT

An electric coolant pump includes a housing, a motor received in the housing, an impeller for driving coolant, and a control unit for controlling the motor. The control unit and the impeller are arranged at opposite ends of the motor. The motor includes a sleeve, a stator mounted around the sleeve, and a rotor rotatably received in the sleeve. The impeller is fixed to the rotor. A radial gap is formed between the sleeve and the rotor. The sleeve includes a plurality of ribs extending from an internal surface of the sleeve into the gap. At least a portion of the ribs of the sleeve guide the coolant towards the control unit to absorb heat generated by the control unit.

18 Claims, 5 Drawing Sheets

ELECTRIC COOLANT PUMP

CROSS REFERENCE TO RELATED APPLICATIONS

This non-provisional patent application claims priority under 35 U.S.C. § 119(a) from Patent Application No. 201410404472.3 filed in The People's Republic of China on Aug. 15, 2014, the entire contents of which are hereby incorporated by reference.

FIELD OF THE INVENTION

This invention relates to cooling systems of vehicles, and in particular, to an electric coolant pump of a cooling system of the vehicle.

BACKGROUND OF THE INVENTION

Coolant pumps are important for the cooling systems of a vehicle. During operation, the coolant pumps drive coolant, such as water, circulating in the cooling systems and thus take away heat from the engine or other heat generating part, thereby ensuring that the vehicle works at a desired temperature.

According to driving modes, the coolant pumps are divided into two kinds, i.e., mechanical pumps and electric pumps. The mechanical pumps are driven by the engine of the vehicles, and thus speeds thereof are determined by the engine and cannot be adjusted. Electric pumps are controlled by independent control units, and can be adjusted according to different requirements. Accordingly, electric pumps are energy-saving and offer better temperature control of the engine, etc.

An electric pump typically includes a motor and an impeller driven by the motor. The motor includes a stator and rotor. The stator includes coils connected to the control unit electrically. The control unit controls electric current of the coils. The rotor has magnets which generate magnetic fields interacting with that of the rotor, thereby driving the rotor. The impeller is connected to and rotates with the rotor, thereby driving the coolant circulating in the cooling system to cool the engine. However, the control unit also generates a lot of heat during operation, which may affect the safety of the pump if the heat is not dissipated timely.

SUMMARY OF THE INVENTION

Hence there is a desire for an electric coolant pump capable of self-cooling.

Accordingly, in one aspect thereof, the present invention provides an electric coolant pump, comprising: a housing; a motor received in the housing, the motor comprising a sleeve, a stator mounted around the sleeve, and a rotor rotatably received in the sleeve, a radial gap being formed between the sleeve and the rotor, wherein the sleeve comprises a plurality of ribs extending from an internal surface of the sleeve towards the rotor; an impeller for driving coolant, the impeller being connected to the rotor and rotating with the rotor; and a control unit for controlling the motor, the control unit and the impeller being respectively arranged at opposite ends of the motor, at least a portion of the ribs of the sleeve guiding the coolant to flow towards the control unit to absorb heat generated by the control unit.

Preferably, the ribs are aslant to an axis of the sleeve, and a tilt angle of each of the ribs is from 0° to 90°.

Preferably, the tilt angle of each rib is from 42° to 67.5°.

Preferably, the ribs are straight as developed along a circumferential direction of the sleeve.

Preferably, the ribs are helical.

Preferably, the ribs are divided into a plurality of groups which are arranged in a circumferential direction of the sleeve and spaced from each other, each of the groups comprises a plurality of ribs arranged in the axial direction and spaced from each other, and a channel is defined between neighboring ribs of each group.

Preferably, at least a portion of the ribs are divided into two groups, one group for guiding the coolant flowing inwardly towards the control unit, and the other group for guiding the coolant flowing outwardly away from the control unit.

Preferably, a flange is formed between the group of ribs guiding the coolant flowing inwardly and the group of ribs guiding the coolant flowing outwardly, the flange extending axially and being spaced from the two groups of ribs in the circumferential direction of the sleeve.

Preferably, the two groups of ribs are arranged symmetrically with respect to the flange.

Preferably, the ribs of a same group extend in the same direction, and the ribs of different groups extend in opposite directions.

Preferably, the ribs are divided into four groups, two adjacent groups for guiding the coolant flowing inwardly towards the control unit, and the other two adjacent groups for guiding the coolant flowing outwardly.

Preferably, the housing comprises a base, a tube extending from an outer periphery of the base, and a cover tightly connected to the tube, the base, the tube and the cover cooperatively defining a first space, the sleeve dividing the first space into an independent internal part inside the sleeve and an external part outside of the sleeve, the stator of the motor being received in the external part, and the rotor being received in the internal part.

Preferably, a first sealing seat extends from the base towards the first space, and a second sealing seat extends from the cover towards the first space, two ends of the sleeve are attached to the sealing seats, respectively.

Preferably, the housing further comprises a first end cap tightly connected to the base, the base and the first end cap cooperatively defining a second space receiving the impeller.

Preferably, the first end cap defines an inlet for coolant entering the pump and an outlet for the coolant leaving the pump, the inlet extending axially, and the outlet extending in a plane substantially perpendicular to the inlet.

Preferably, the base defines an opening at a central portion thereof, the rotor comprises a shaft extending through the opening to connect with the impeller, a plurality of through holes are defined in the base around the opening, the through holes being located at an inner side of the sleeve, communicating the internal part of the first space with the second space.

Preferably, the housing further comprises a second end cap tightly connected to the cover, the cover and the second end cap cooperatively defining a third space receiving the control unit.

Compared to known pumps, the electric coolant pump of the present invention has a sleeve with ribs for guiding the flow of the coolant towards the control unit to absorb heat generated by the control unit, thus the pump that drives the coolant flow in the cooling system not only cools the engine, but also achieves self-cooling of the pump, ensuring that the pump works at or below a desired temperature. Accordingly, the pump and the vehicle are safer.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The present invention is described, by way of example only, with reference to the preferred embodiments of an electric coolant pump for a cooling system of a vehicle, which drives the coolant recirculating in the cooling system. The coolant is a fluid, such as water, which exchanges heat with heat generating apparatus, such as an engine of the vehicle, during recirculating in the cooling system, thereby cooling the heat generating apparatus.

Figure 1:
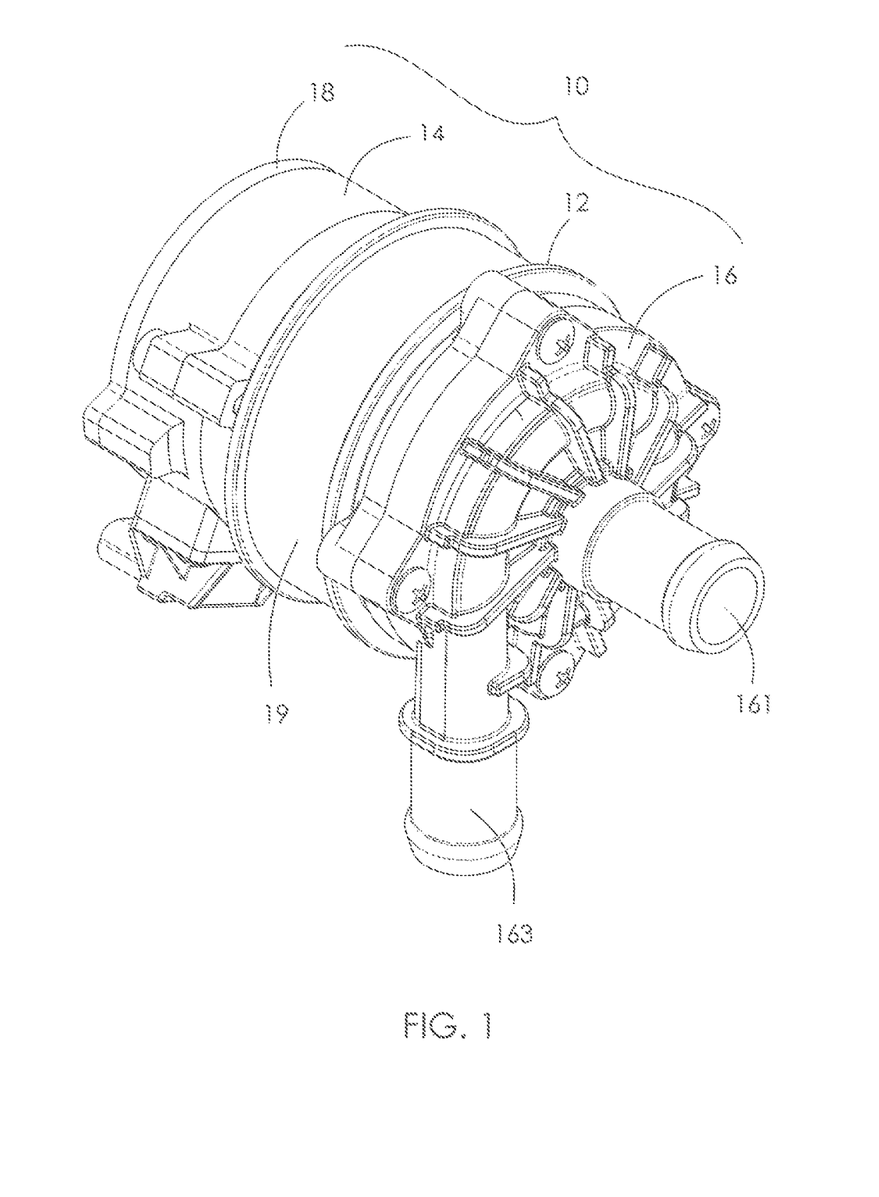
FIG. 1 illustrates an electric coolant pump according to an embodiment of the present invention.
Figure 2:
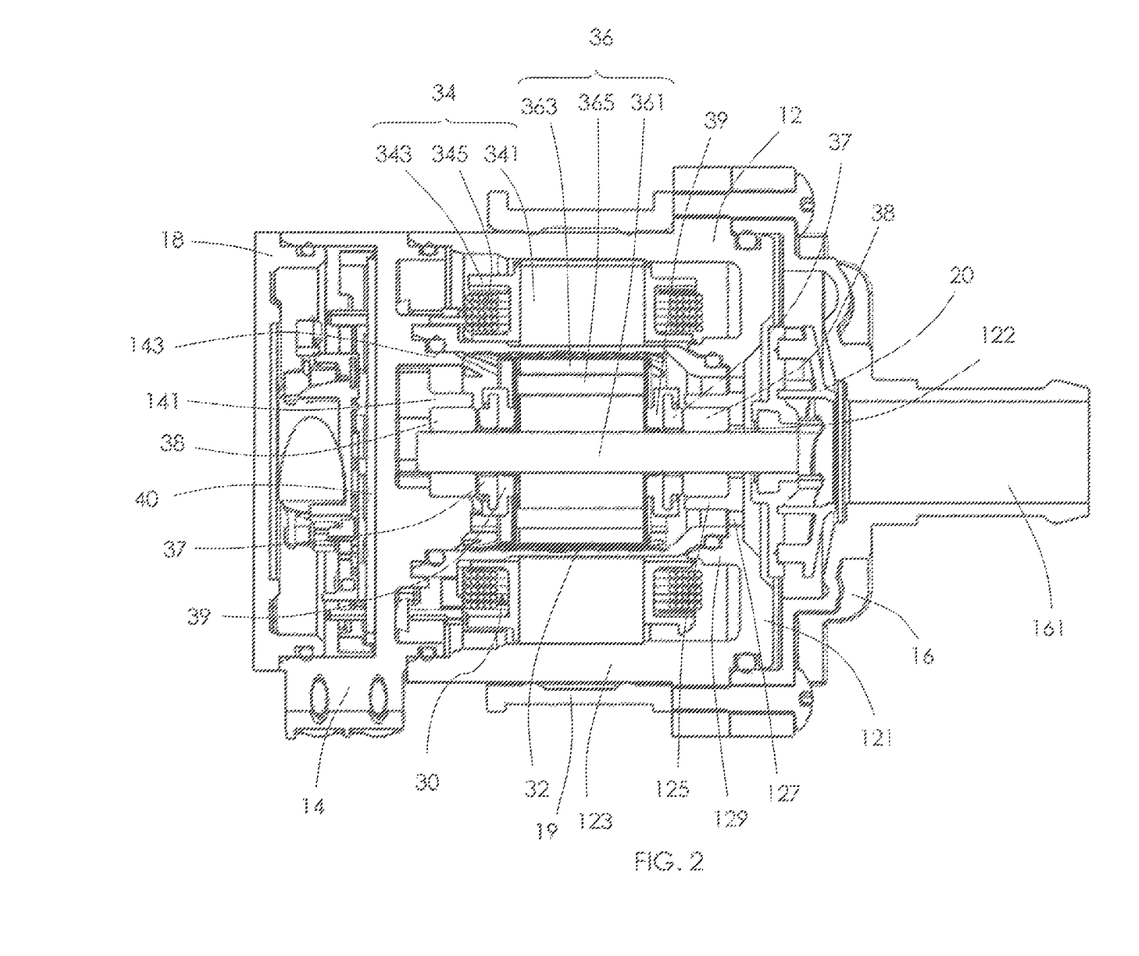
FIG. 2 is a sectional view of the pump of FIG. 1.

As shown in FIGS. 1 and 2, the electric coolant pump includes a housing 10, an impeller 20 received in the housing 10, a motor 30 for driving the impeller 20, and a control unit 40 for controlling operation of the motor 30. The housing 10 includes a shell 12, a cover 14, a first end cap 16, and a second end cap 18.

The shell 12 is cylindrical with one end thereof being open, and includes a circular base 121 and a tube 123 extending perpendicularly from an outer periphery of the base 121. The cover 14 is tightly connected to the tube 123 of the shell 12, and seals the open end of the shell 12. The shell 12 and cover 14 cooperatively define a first space for receiving the motor 30 therein. The first end cap 16 is mounted around the base 121, and defines a second space there between, for receiving the impeller 20. The second end cap 18 covers the cover 14, thereby defining a third space there between for receiving the control unit 40.

The control unit 40 and the impeller 20 are arranged at opposite axial ends of the motor 30. The control unit 40 is electrically connected to the motor 30 for controlling operation of the motor 30. The impeller 20 is connected to and driven by the motor 30.

In this embodiment, the impeller 20 is a centrifugal impeller. The first end cap 16 defines an inlet 161 and an outlet 163 therein. The inlet 161 extends axially, while the outlet 163 extends tangentially in a radial plane. The outlet 163 is substantially perpendicular to the axial direction of the pump. The inlet 161 and the outlet 163 are connected to pipes, tubes or hoses of the cooling system. As the impeller 20 rotates, the coolant flows into the second space via the inlet 161, and then flows out through the outlet 163 to circulate around the cooling system to remove heat from the engine of the vehicle. The coolant gains both velocity and pressure while passing through the impeller 20 in the second space.

Connections between the first end cap 16 and the shell 12, between the shell 12 and the cover 14, and between the cover 14 and the second end cap 18 can be achieved by screwing, crimping or riveting. To ensure water tightness of the pump, sealing rings are used at the connections, avoiding leakage of the coolant. Further, damage to the stator of the motor 30 and control unit 40 is avoided as moisture cannot enter these parts of the pump. In this embodiment, a rubber sleeve 19 is mounted around the tube 123 of the shell 12 for mounting of the pump.

The base 121 of the shell 12 defines an opening 122 in a central portion thereof. The opening is coaxial with the shell 12 and extends through the base 121. A first bearing seat 125 extends perpendicularly from a periphery of the opening of the base 121 towards the first space, and is coaxial with the opening. An inner diameter of the first bearing seat 125 is larger than a diameter of the opening. A plurality of through holes 127 are defined in the base 121 around the first bearing seat 125, communicating the first space and the second space. Thus, the coolant can flow between the first and second spaces via the through holes 127.

A first sealing seat 129 extends perpendicularly from the base 121 into the first space. The sealing seat is annular in this embodiment, and surrounds the through holes 127. That is, the through holes 127 locate at a radially inner side of the first sealing seat 129. The first sealing seat 129 and first bearing seat 125 are coaxial, and spaced from each other in the radial direction. The through holes 127 are located between the first sealing seat 129 and first bearing seat 125.

A second bearing seat 141, and a second sealing seat 143 extend perpendicularly from a central portion of the cover 14 into the first space. The second sealing seat 143 is coaxial with the second bearing seat 141, and surrounds the second bearing seat 141. In this embodiment, the second bearing seat 141 and the first beating seat are coaxial and oriented towards each other. The second sealing seat 143 and first sealing seat 129 are oriented towards each other.

The motor 30 is mounted in the first space of the housing 10, and includes a sealing sleeve 32, a stator 34 mounted around the sleeve 32, a rotor 36 rotatably received in the sleeve 32, and two bearings 38 rotatably supporting the rotor 36.

Figure 3:
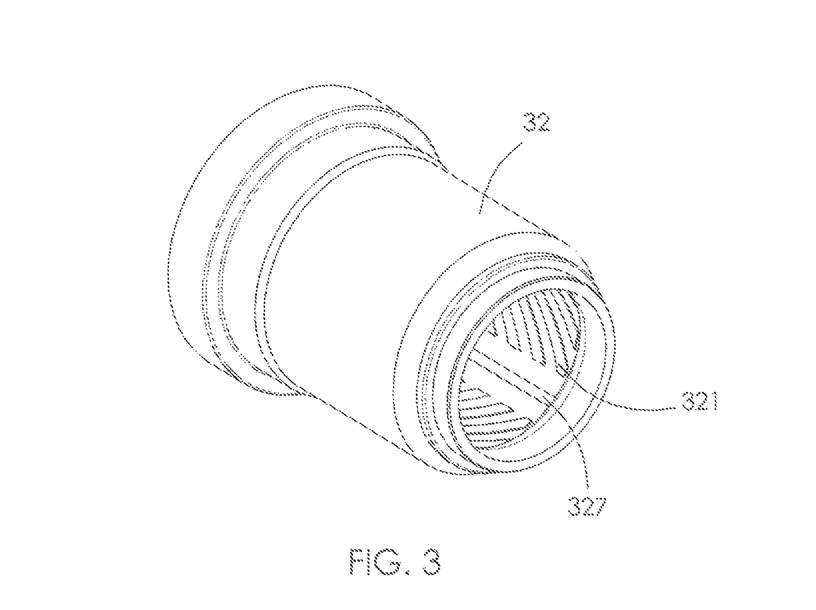
FIG. 3 illustrates a sealing sleeve, being a part of the pump of FIG. 1.
Figure 4:
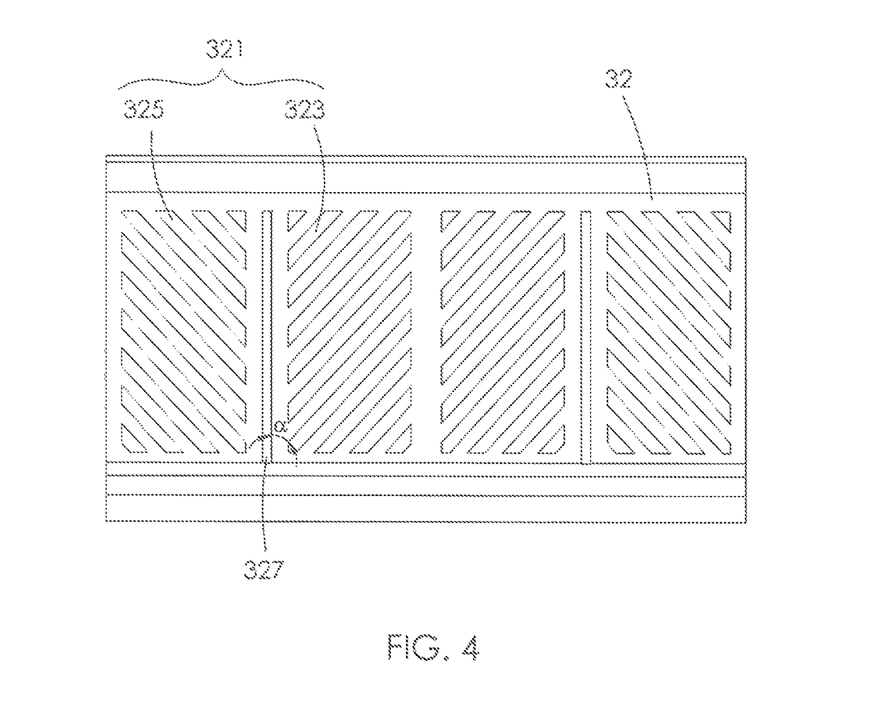
FIG. 4 is a developed view of an internal surface of the sealing sleeve.

Referring to FIGS. 3 and 4, the sleeve 32 is cylindrical and hollow. The ends of the sleeve 32 are tightly connected to the first and second sealing seats 129, 143, thereby separating the first space into two independent parts, i.e., an internal part inside the sleeve 32, and an external part outside of the sleeve 32. In this embodiment, one end of the sleeve 32 is fixed in the first sealing seat 129, and the other end is fixed around the second sealing seat 143.

To ensure that the connections between the sleeve 32 and the first and second sealing seats 129, 143 are water tight, sealing rings are respectively arranged between the sleeve 32 and first sealing seat 129, and between the sleeve 32 and second sealing seat 143. Thus, the internal part and external part of the first space are fluidly isolated from each other. The internal part of the first space communicates with the second space via the through holes 127 of the base 121, and the external part of the first space is fluidly isolated from the second space by the sleeve 32. The coolant thus can flow into the internal part of the first space, but cannot enter the external part of the first space.

The stator 34 is received in the external part of the first space. The stator 34 includes a stator core 341, a bobbin 343 covering the stator core 341, and windings 345 wound around the stator core 341. The windings 345 are insulated from the stator core 341 by the bobbin 343. The stator core 341 can be stacked silicon steel laminations. The coils 345 are electrically connected to the control unit 40 by pins.

The control unit 40 is received in the third space, and includes a plurality of electronic components attached to or adjacent to the cover 14. The control unit 40 is connected to a power source and the motor 30, thereby controlling operation of the motor 30. During operation of the control unit 40 of the present pump, a lot of heat is generated by the electronic components. Preferably, the cover 14 is made of metal, such as aluminum, for absorbing heat generated by the control unit 40.

The rotor 36 is mounted inside the sleeve 32, and includes a shaft 361, a magnetic core 363 fixed on the shaft 361, and permanent magnets 365 fixed in the magnetic core 363. Two ends of the shaft 361 are rotatably supported by the two bearings 38, respectively. The two bearings 38 are respectively received in the first and second bearing seats 125, 141. An inner diameter of the bearing 38 is substantially equal to the diameter of the shaft 361. One end of the shaft 361 extends through the corresponding bearing 38 and the opening 122 of the base 121 of the shell 12 into the second space, and fixedly connects to the impeller 20. Thus, the impeller 20 rotates along with the shaft 361 of the rotor 36. The other end of the shaft 361 is rotatably received in the other bearing 38.

A spacer 37 is mounted around the shaft 361 adjacent to the bearing 38, at one or both ends on the rotor, to fix the axial position of the rotor 36. Preferably, the spacer 37 is made of a wear resistance material, such as ceramic, for reducing friction during rotation of the rotor 36. An inner diameter of the spacer 37 may be slightly larger than the diameter of the shaft 361. In such a situation, a rubber element 39 may be used to fix the spacer to the shaft 361 and buffer axial vibrations of the rotating rotor 36, thereby lowering the noise of the motor 30.

An outer diameter of the rotor 36 is less than an inner diameter of the sleeve 32. A radial gap is thus defined between the rotor 36 and the sleeve 32, for the coolant to flow there through. Therefore, the coolant can flow to the cover 14 to absorb heat from the control unit 40. The sleeve 32 has a plurality of ribs 321 extending from an internal surface thereof to the gap, for guiding flowing of the coolant. The ribs 321 are divided into several groups in the circumferential direction of the sleeve. Each group of ribs 321 are arranged in the axial direction of the sleeve 32 and evenly spaced from each other. A channel is defined between neighboring ribs 321 for coolant to flow there through.

Figure 5:
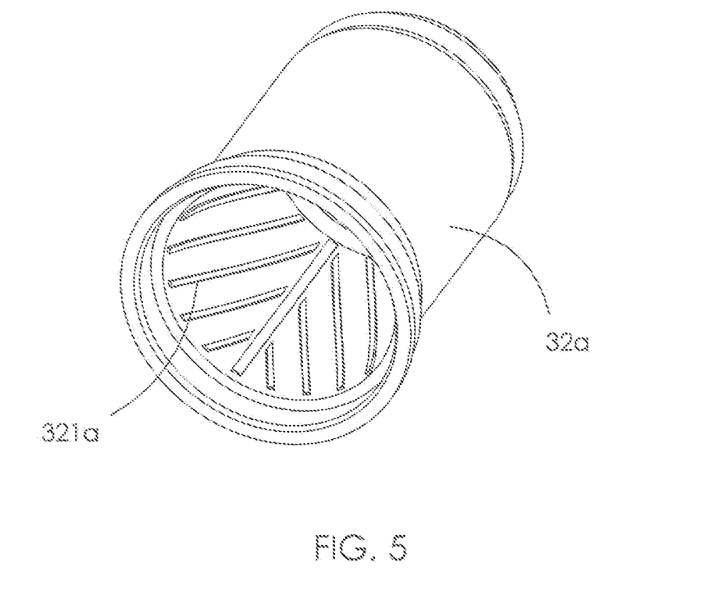
FIG. 5 shows a sealing sleeve according to a second embodiment.

A density of the ribs 321 determines a width of the channel, and can be adapted to different requirements. High density of the ribs 321 results in narrow channels and high flowing resistance, which is favorable for guiding the coolant, but unfavorable to the flow of the coolant. In contrast, low density of the ribs 321 results in wide channels, which is favorable to the flow of the coolant, but unfavorable for guiding the coolant. As shown in FIG. 5, the sleeve 32a according to a second embodiment has ribs 321a arranged sparsely, and thus channels between the ribs 321a are wider compared to other embodiments.

As shown in FIGS. 3 and 4, in this embodiment, the ribs 321 are divided into four groups, i.e., two inward groups 323 for guiding coolant inwardly, and two outward groups 325 for guiding coolant outwardly. The inward groups 323 and outward groups 325 are arranged symmetrically. In the circumferential direction of the sleeve 32, the two inward groups 323 are neighboring, and the two outward groups 325 are neighboring. The groups 232, 325 are spaced from each other. A flange 327 is formed between each inward group 321 and a neighboring outward group 321. The flanges 327 extend axially, while each of the ribs 321 is aslant to the axial direction.

Figure 6:
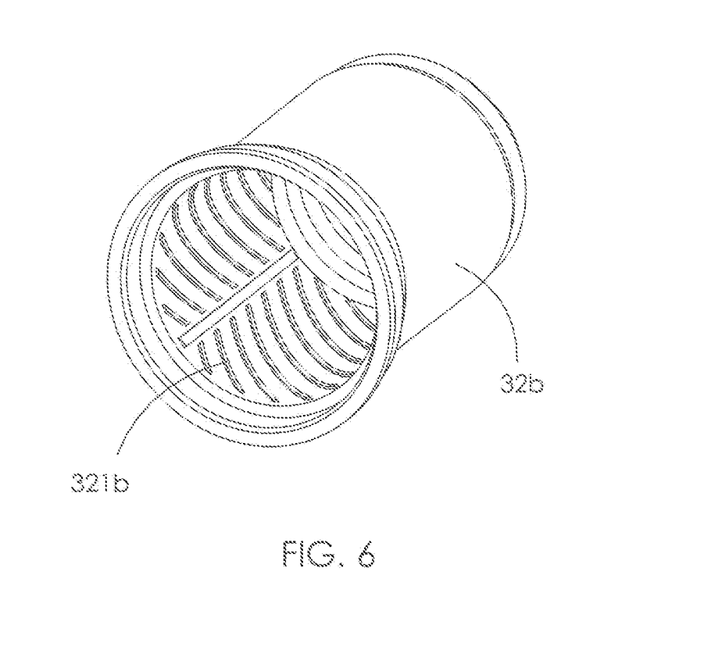
FIG. 6 shows a sealing sleeve according to a third embodiment.

As developed in the circumferential direction, preferably, the ribs 321 in this embodiment are straight. Thus, the flow of the coolant in the channels between the ribs 321 can be decomposed into two motions in two directions, i.e., rotation in the circumferential direction and movement in the axial direction. A tilt angle $\alpha$ of the rib 321 determines a flowing direction of the coolant. The tilt angle $\alpha$ can be from 0 to 90°, preferably from 42° to 67.5°, ensuring that the coolant flows quickly to the cover 14 to cool the control unit 40. As shown in FIGS. 3 and 4, the ribs 32 of the sleeve 32 each have a tile angle $\alpha$ of about 45° with respect to the flange 327, i.e., the axial direction. In another embodiment shown in FIG. 6, the ribs 321b of the sleeve 32b each have a tilt angle $\alpha$ about 67.5° with respect to the axial direction of the sleeve 32.

During operation of the pump, the control unit 40 provides suitable electric current in the coils 345 and the rotor 36 cooperates with the stator 34 to drive the impeller 20. Rotation of the impeller 20 generates negative pressure to draw the coolant into the second space. Since the second space communicates with the internal part of the first space inside the sleeve 32 via the through holes 127 of the base 121, part of the coolant flows through the through holes 127 into the sleeve 32, and then enters the gap between the rotor 36 and the sleeve 32. During operation, the coolant rotates along with the rotor 36 and moves along the ribs 321 towards the cover 14.

In this embodiment, the inward and outward groups 323, 325, and the flange 327 divide the internal surface of the sleeve 32 into two independent portions, one portion with the inward groups 323 making the coolant flow towards the cover 14 to absorb the heat generated by the control unit 40, and the other portion with the outward groups 325 making the coolant at the cover 14 flow back towards the base 121. Thus, the inward passage and outward passage for the coolant are substantially independent due to the flanges 327.

The coolant flows to the cover 14 to absorb heat of the control unit 40 under the guidance of the inward groups 323, and then flows back to the base 121 under the guidance of the outward groups 325, and finally flows into the second space via the through holes 127 of the base 121, thereby forming a circulation loop inside the pump, taking heat away from the control unit 40 efficiently, and achieving self-cooling of the pump. Preferably, the through holes 127 are arranged symmetrically to a plane defined by the two flanges 327. Preferably, the base 121 defines at least one through hole 127 corresponding to each group of ribs 321.

In the present invention, the pump forms ribs 321 in the sleeve 32 guiding flow of the coolant, the coolant in the sleeve 32 thus circulates to cool the control unit 40, ensuring low working temperature of the pump. It should be understood that the ribs 321 are for guiding flow of the coolant, the shape, tilt angle $\alpha$, density, and thickness of the ribs may influence the flow of the coolant, and should be designed according to needs.

Figure 7:
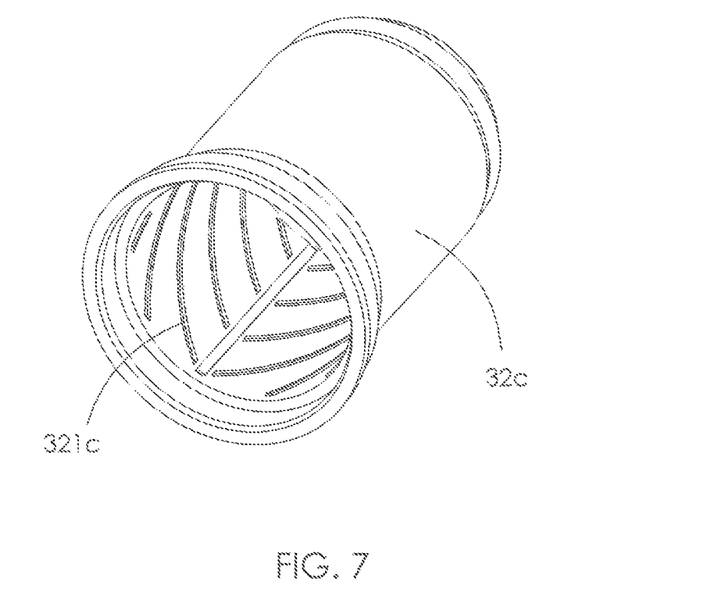
FIG. 7 shows a sealing sleeve according to a fourth embodiment.

As shown in FIG. 7, the ribs 321c of the sleeve 32c, according to a fourth embodiment, are helical, which may reduce energy loss caused by the flow of the coolant. Thus, the flow of the coolant in the pump is smooth and quick, which can remove heat from the control unit 40 in a timely manner.

Figure 8:
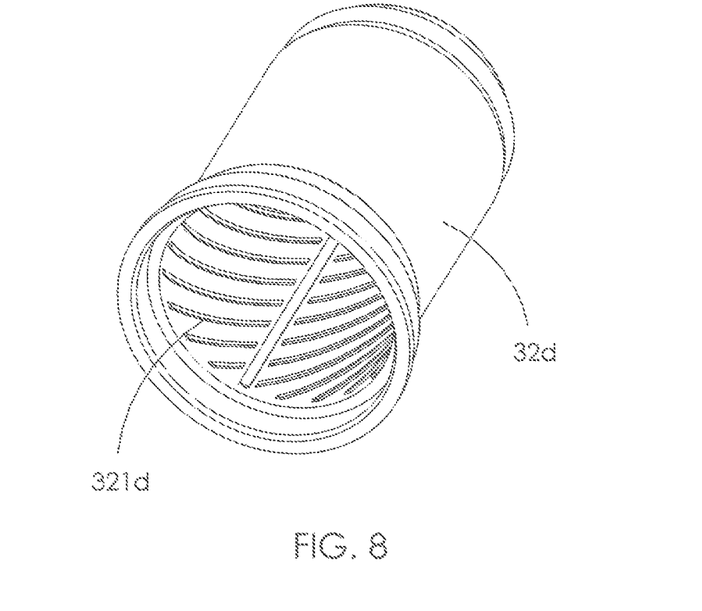
FIG. 8 shows a sealing sleeve according to a fifth embodiment.

A fifth embodiment of the sleeve 32 is shown in FIG. 8. In this embodiment, the ribs 321*d* of the sleeve 32*d* are divided into several spaced groups, all of which are the same in construction, for guiding the coolant inwards to the cover 14. With the coolant continuously flowing to the cover 14, the coolant absorbs heat from the control unit 40, via the cover and then flows back to the impeller to form a circulation loop.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric coolant pump, comprising:
   a housing;
   a motor received in the housing, the motor comprising a sleeve, a stator mounted around the sleeve, and a rotor including a shaft, rotatably received in the sleeve, a radial gap being formed between the sleeve and the rotor;
   an impeller for driving coolant, the impeller being fixed to the shaft; and
   a control unit for controlling the motor, the control unit and the impeller being respectively arranged at opposite ends of the motor,
   wherein the housing comprises: a shell having a base and a tube extending from an outer periphery of the base; a cover tightly connected to the tube, the shell and the cover cooperatively defining a first space, the sleeve dividing the first space into an independent internal part inside the sleeve and an external part outside the sleeve, the stator being disposed in the external part; a first sealing seat extends from the base towards the first space; a second sealing seat extends from the cover towards the first space, two ends of the sleeve are attached to the sealing seats, respectively; a first end cap tightly connected to the base, the base and the first end cap cooperatively defining a second space receiving the impeller, the first end cap having an inlet and an outlet; an opening defined at a central portion of the base, the shaft extending through the opening to connect with the impeller; a plurality of through holes formed in the base around the opening, the through holes communicating the second space with the internal part of the first space; and a second end cap tightly connected to the cover, the cover and the second end cap cooperatively defining a third space receiving the control unit, and
   wherein the sleeve comprises a plurality of ribs extending in a helical manner along an internal surface of the sleeve and at least a portion of the ribs guiding the coolant to flow towards the control unit to absorb heat generated by the control unit.

2. An electric coolant pump, comprising:
   a housing;
   a motor received in the housing, the motor comprising a sleeve, a stator mounted around the sleeve, and a rotor rotatably received in the sleeve, a radial gap being formed between the sleeve and the rotor, wherein the sleeve comprises a plurality of ribs extending from an internal surface of the sleeve towards the rotor;
   an impeller for driving coolant, the impeller being connected to the rotor and rotating with the rotor; and
   a control unit for controlling the motor, the control unit and the impeller being respectively arranged at opposite ends of the motor, at least a portion of the ribs of the sleeve guiding the coolant to flow towards the control unit to absorb heat generated by the control unit,
   wherein the ribs are divided into a plurality of groups which are arranged in a circumferential direction of the sleeve and spaced from each other, each of the groups comprises a plurality of ribs arranged in the axial direction and spaced from each other, and a channel is defined between neighboring ribs of each group.

3. The pump of claim 2, wherein the ribs are aslant to an axis of the sleeve, and a tilt angle of each of the ribs is from 0° to 90°.

4. The pump of claim 3, wherein the tilt angle of each rib is from 42° to 67.5°.

5. The pump of claim 2, wherein the ribs are straight as developed along a circumferential direction of the sleeve.

6. The pump of claim 2, wherein the ribs are helical.

7. The pump of claim 2, wherein the groups are spaced from each other in the circumferential direction of the sleeve.

8. The pump of claim 2, wherein at least a portion of the ribs are divided into two groups, one group for guiding the coolant flowing inwardly towards the control unit, and the other group for guiding the coolant flowing outwardly away from the control unit.

9. The pump of claim 8, wherein a flange is formed between the group of ribs guiding the coolant flowing inwardly and the group of ribs guiding the coolant flowing outwardly, the flange extending axially and being spaced from the two groups of ribs in the circumferential direction of the sleeve.

10. The pump of claim 9, wherein the two groups of ribs are arranged symmetrically with respect to the flange.

11. The pump of claim 9, wherein the ribs of a same group extend in the same direction, and the ribs of different groups extend in opposite directions.

12. The pump of claim 2, wherein the ribs are divided into four groups, two adjacent groups for guiding the coolant flowing inwardly towards the control unit, and the other two adjacent groups for guiding the coolant flowing outwardly.

13. The pump of claim 2, wherein the housing comprises a base, a tube extending from an outer periphery of the base, and a cover tightly connected to the tube, the base, the tube and the cover cooperatively defining a first space, the sleeve dividing the first space into an independent internal part inside the sleeve and an external part outside of the sleeve, the stator of the motor being received in the external part, and the rotor being received in the internal part.

14. The pump of claim 13, wherein a first sealing seat extends from the base towards the first space, and a second sealing seat extends from the cover towards the first space, two ends of the sleeve are attached to the sealing seats, respectively.

15. The pump of claim 13, wherein the housing further comprises a first end cap tightly connected to the base, the base and the first end cap cooperatively defining a second space receiving the impeller.

16. The pump of claim 15, wherein the first end cap defines an inlet for coolant entering the pump and an outlet for the coolant leaving the pump, the inlet extending axially, and the outlet extending in a plane substantially perpendicular to the inlet.

17. The pump of claim 15, wherein the base defines an opening at a central portion thereof, the rotor comprises a shaft extending through the opening to connect with the impeller, a plurality of through holes are defined in the base around the opening, the through holes being located at an inner side of the sleeve, communicating the internal part of the first space with the second space.

18. The pump of claim 13, wherein the housing further comprises a second end cap tightly connected to the cover, the cover and the second end cap cooperatively defining a third space receiving the control unit.

\* \* \* \* \*